US009219416B2

(12) United States Patent
Seok

(10) Patent No.: US 9,219,416 B2
(45) Date of Patent: Dec. 22, 2015

(54) BUCK CONVERTER HAVING SELF-DRIVEN BJT SYNCHRONOUS RECTIFIER

(71) Applicant: IXYS Corporation, Milpitas, CA (US)

(72) Inventor: Kyoung Wook Seok, Milpitas, CA (US)

(73) Assignee: IXYS Corporation, Milpitas, CA (US)

( * ) Notice: Subject to any disclaimer, the term of this patent is extended or adjusted under 35 U.S.C. 154(b) by 34 days.

(21) Appl. No.: 14/093,458

(22) Filed: Nov. 30, 2013

(65) Prior Publication Data

US 2015/0155785 A1 Jun. 4, 2015

(51) Int. Cl.
*H02M 3/158* (2006.01)
*H02J 1/10* (2006.01)
*H02M 3/156* (2006.01)

(52) U.S. Cl.
CPC .............. *H02M 3/1588* (2013.01); *H02J 1/102* (2013.01); *H02M 3/156* (2013.01); *H02M 3/158* (2013.01); *H02M 3/1582* (2013.01); *H02M 3/1584* (2013.01); *H02M 2003/1586* (2013.01); *Y02B 70/1466* (2013.01)

(58) Field of Classification Search
CPC ...................................................... H02M 3/1588
See application file for complete search history.

(56) References Cited

U.S. PATENT DOCUMENTS

| 3,582,758 | A * | 6/1971 | Gunn | 363/127 |
| 6,430,071 | B1 * | 8/2002 | Haneda | 363/127 |
| 6,522,113 | B1 * | 2/2003 | Betten | 323/282 |
| 7,035,120 | B2 * | 4/2006 | Tobita | 363/21.06 |
| 7,715,216 | B2 * | 5/2010 | Liu et al. | 363/89 |
| 8,502,511 | B1 * | 8/2013 | Kung | 323/225 |
| 2005/0007082 | A1 * | 1/2005 | Bretz et al. | 323/274 |
| 2005/0030770 | A1 * | 2/2005 | Sutardja et al. | 363/41 |
| 2005/0057229 | A1 * | 3/2005 | Kobayashi | 323/222 |
| 2007/0216389 | A1 * | 9/2007 | Nishida | 323/284 |
| 2008/0061755 | A1 * | 3/2008 | Michishita | 323/282 |
| 2009/0243568 | A1 * | 10/2009 | Nguyen | 323/274 |
| 2011/0101947 | A1 * | 5/2011 | Gajanana et al. | 323/283 |
| 2011/0115451 | A1 * | 5/2011 | Hashimoto et al. | 323/272 |
| 2011/0273155 | A1 * | 11/2011 | Weir | 323/283 |
| 2012/0049828 | A1 * | 3/2012 | Hara et al. | 323/284 |
| 2012/0153929 | A1 * | 6/2012 | Yonezawa et al. | 323/311 |
| 2012/0229111 | A1 * | 9/2012 | Serdarevic | 323/282 |
| 2013/0093403 | A1 * | 4/2013 | Jia et al. | 323/272 |
| 2013/0107583 | A1 * | 5/2013 | Seok | 363/21.12 |
| 2013/0128626 | A1 * | 5/2013 | Seok et al. | 363/21.14 |
| 2013/0249529 | A1 * | 9/2013 | Seok | 323/364 |

* cited by examiner

*Primary Examiner* — Nguyen Tran
*Assistant Examiner* — Bryan R Perez
(74) *Attorney, Agent, or Firm* — Imperium Patent Works; T. Lester Wallace

(57) ABSTRACT

A switching converter has a self-driven bipolar junction transistor (BJT) synchronous rectifier. The BJT rectifier includes a BJT and a parallel-connected diode, and has a low forward voltage drop. In a first portion of a switching cycle, a main switch is on and the BJT rectifier is off. Current flows from an input, through the main switch, through the first inductor, to an output. Current also flows through the main switch, through the second inductor, to the output. In a second portion of the cycle, the main switch is turned off but the inductor currents continue to flow. Current flows from a ground node, through the BJT rectifier, through the first inductor, to the output. The BJT is on due to the second inductor drawing a base current from the BJT. In one example, the main switch is a split-source NFET that conducts separate currents through the two inductors.

18 Claims, 11 Drawing Sheets

STEP-DOWN DC-TO-DC CONVERTER WITH SELF-DRIVEN SYNCHRONOUS BJT RECTIFIER

PC MOTHERBOARD WITH MULTIPLE BUCK
CONVERTERS

OPERATION OF PRIOR ART CIRCUIT OF FIG. 1

SIMPLIFIED SCHEMATIC OF A BUCK CONVERTER

INDUCTIVE CURRENT SPLITTING

STEP-DOWN DC-TO-DC CONVERTER WITH SELF-DRIVEN
SYNCHRONOUS BJT RECTIFIER

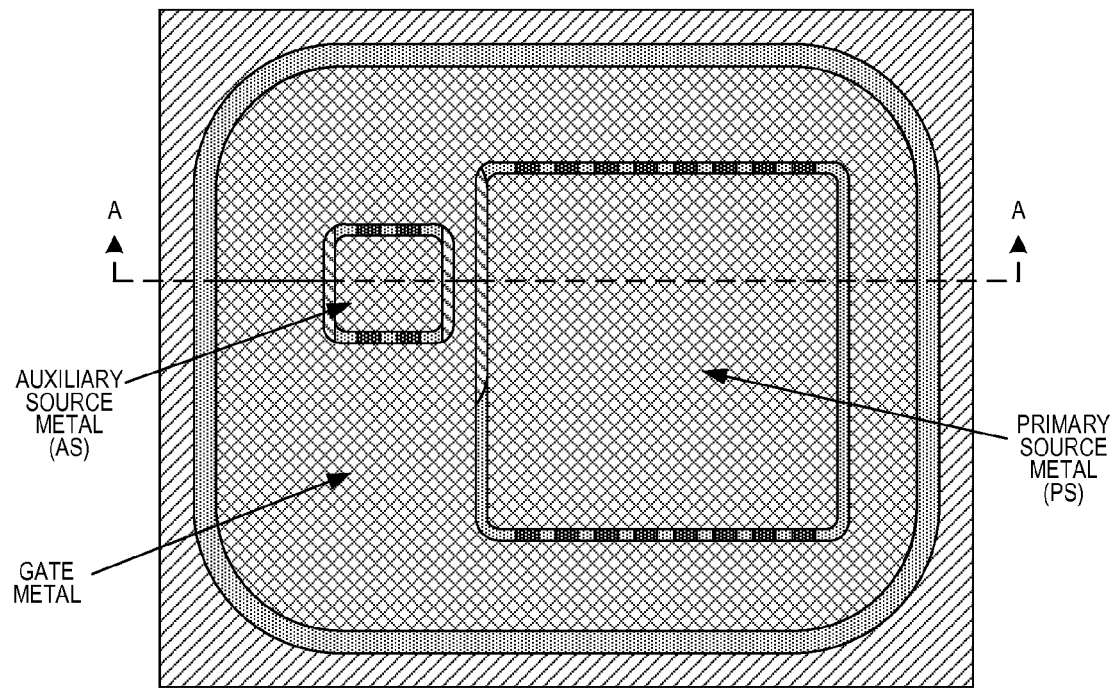
SPLIT SOURCE N-CHANNEL FET
(TOP-DOWN VIEW ONTO TOP METAL LAYER)
FIG. 7A
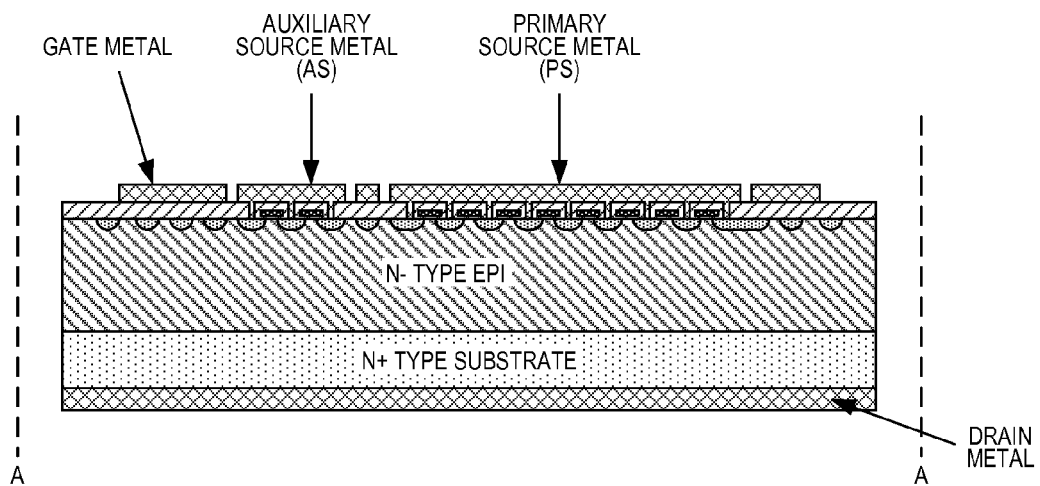
CROSS-SECTIONAL SIDE VIEW TAKEN ALONG LINE A-A OF
FIGURE 7A
FIG. 7B

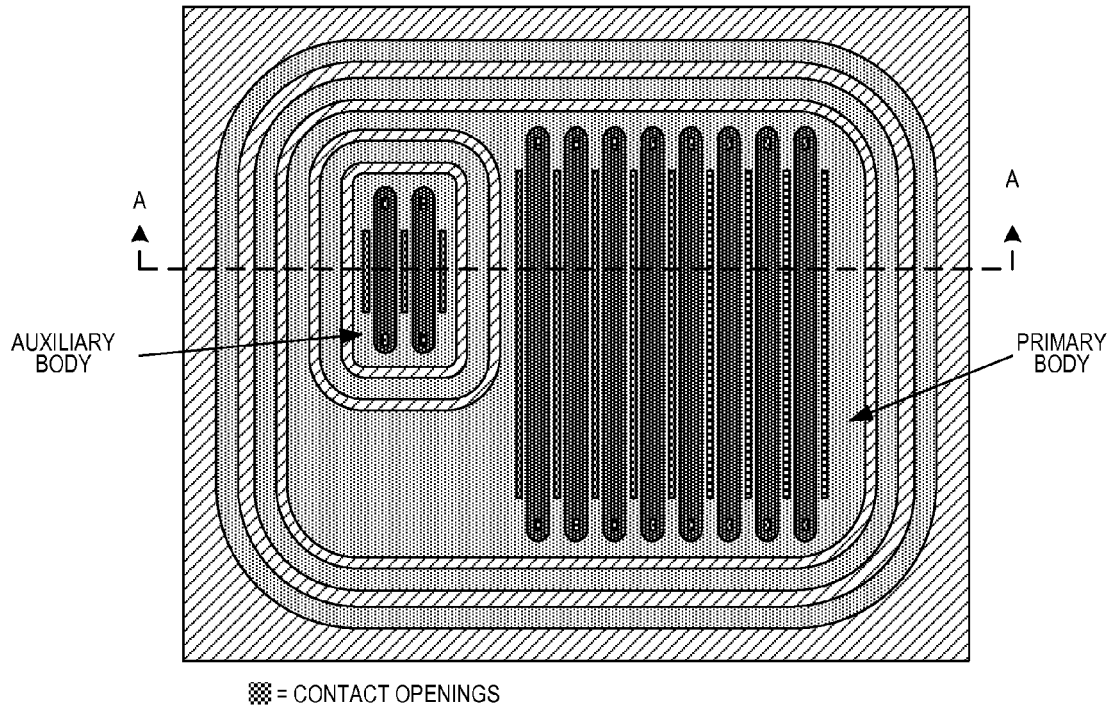
SPLIT SOURCE N-CHANNEL FET
(TOP-DOWN VIEW ONTO INSULATION LAYER)
FIG. 8A
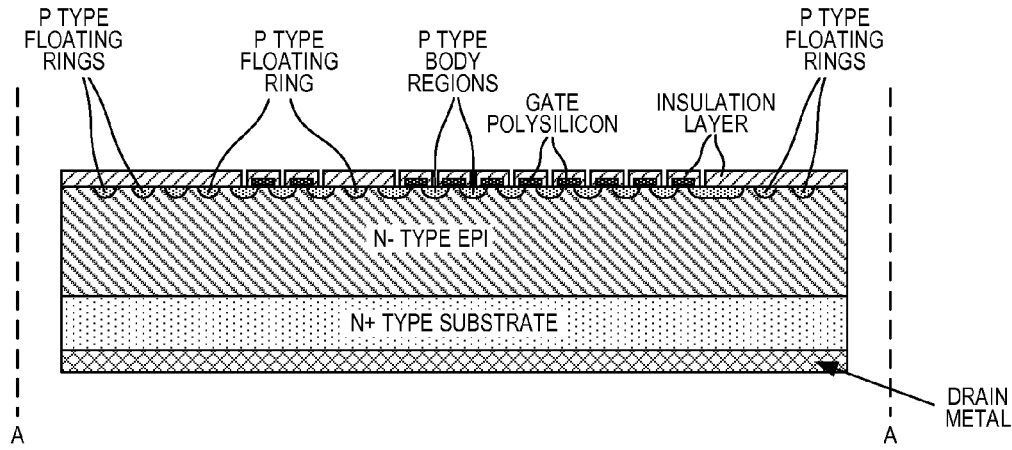
CROSS-SECTIONAL SIDE VIEW TAKEN ALONG LINE A-A OF
FIGURE 8A
FIG. 8B

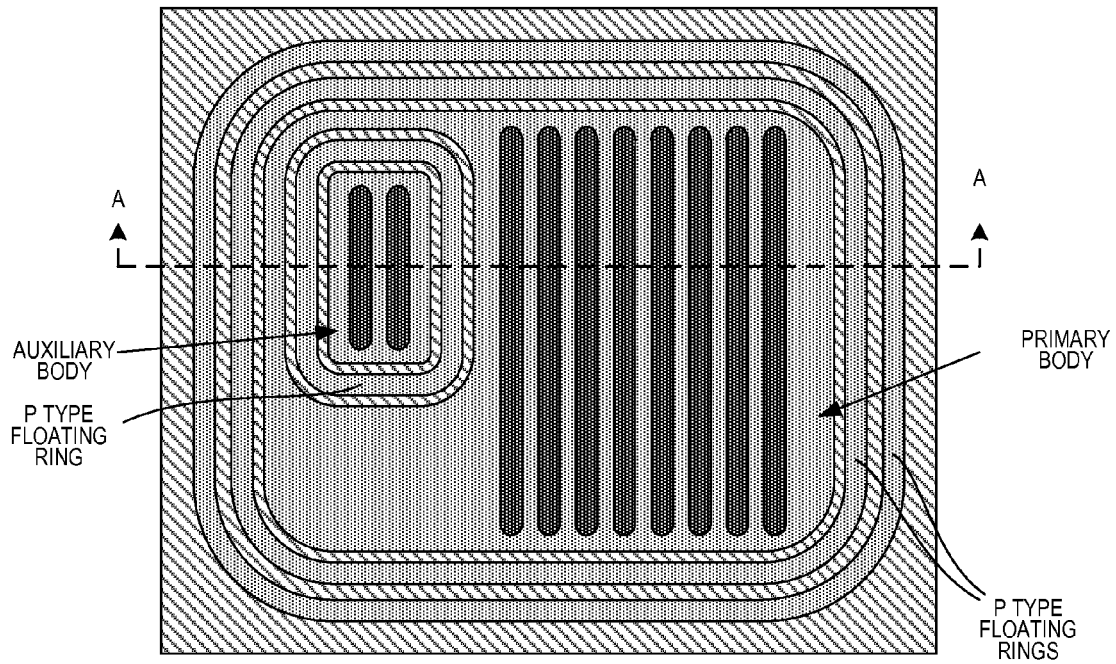
SPLIT SOURCE N-CHANNEL FET
(TOP-DOWN VIEW OF POLYSILICON LAYER)
FIG. 9A
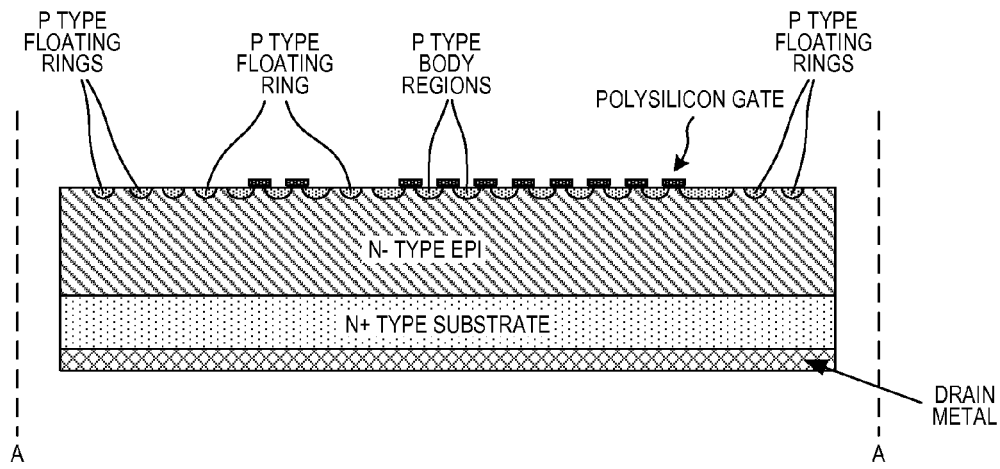
CROSS-SECTIONAL SIDE VIEW TAKEN ALONG LINE A-A OF
FIGURE 9A
FIG. 9B

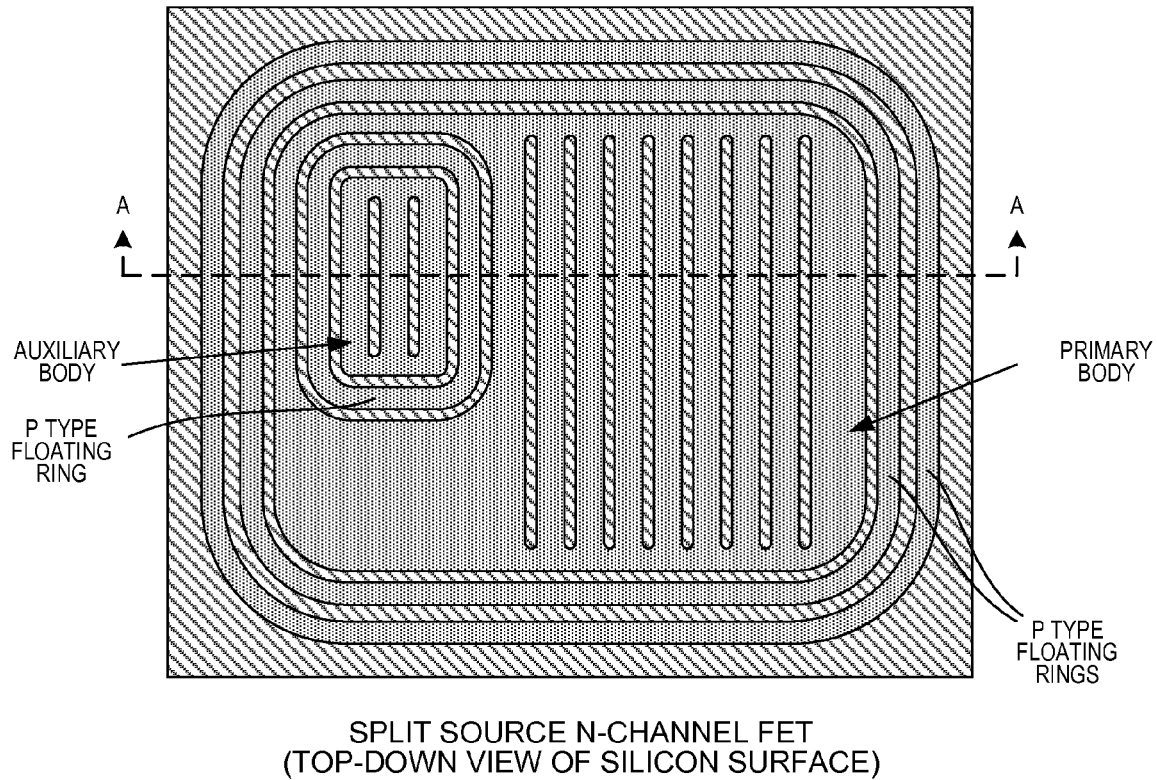
SPLIT SOURCE N-CHANNEL FET
(TOP-DOWN VIEW OF SILICON SURFACE)
FIG. 10A
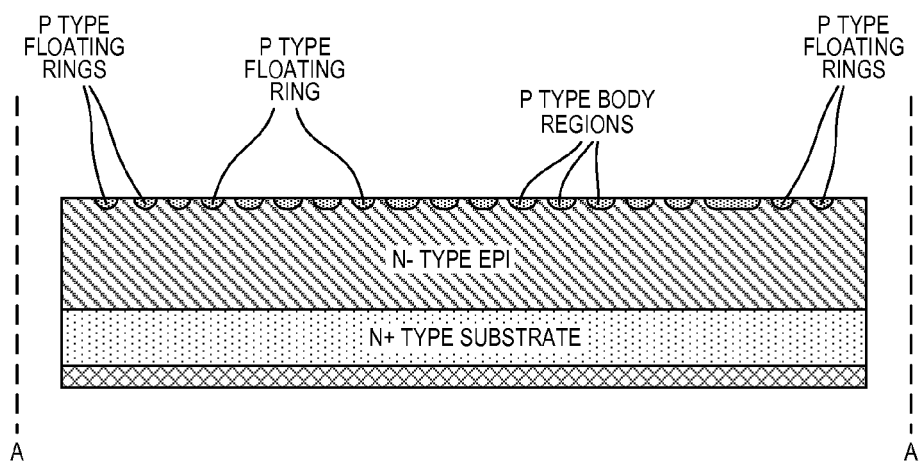
CROSS-SECTIONAL SIDE VIEW TAKEN ALONG LINE A-A OF
FIGURE 10A
FIG. 10B

DISCONTINUOUS CONDUCTION MODE

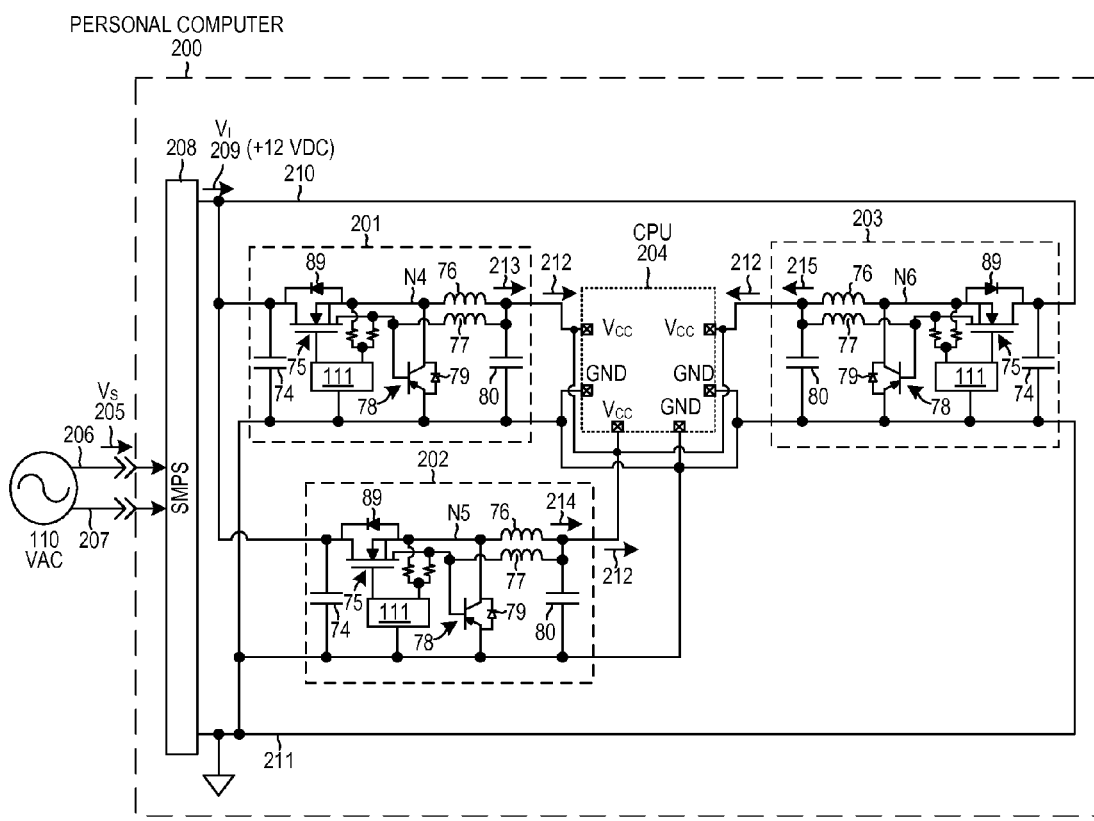

|  | COST REDUCTION | POWER CONSUMPTION (%EFFICIENCY) | SAFETY/ RELIABILITY |
|---|---|---|---|
| CONVENTIONAL BUCK CONVERTER (FIG. 1) | REQUIRES LOW SIDE DRIVER |  | POSSIBLE SHORT CIRCUIT |
| BUCK CONVERTER HAVING SELF-DRIVEN BJT SYNCHONOUS RECTIFIER (FIG. 6) | NO LOW SIDE DRIVER - LESS EXPENSIVE GATE DRIVER CHIP | ~5% IMPROVEMENT OVER FIG. 1 BUCK CONVERTER | NO SHORT CIRCUIT PROBLEM |

FIG. 13

PC MOTHERBOARD WITH BUCK CONVERTERS HAVING SELF-DRIVEN BJT SYNCHRONOUS RECTIFIERS

FIG. 14

OPERATION OF CIRCUIT OF FIG. 14

BUCK CONVERTER HAVING SELF-DRIVEN BJT SYNCHRONOUS RECTIFIER

TECHNICAL FIELD

The described embodiments relate generally to buck converters, such as buck converters used to supply power to the CPUs of personal computers.

BACKGROUND INFORMATION

FIG. 1 (Prior Art) is a simplified diagram of circuitry found in some personal computers. Personal computer 1 receives a 110 volt AC (Alternating Current) RMS (Root Mean Square) supply voltage $V_S$ 2 via terminals 3 and 4. A Switching Mode Power Supply (SMPS) 5 converts the AC supply voltage $V_S$ 2 into a rough DC voltage $V_I$ 6. The DC voltage $V_I$ 6 is present between supply voltage conductor 7 and ground conductor 8. In one example, the DC voltage $V_I$ is +12 volts DC. The personal computer further includes multiple buck converters 9, 10 and 11 that may be physically organized around a CPU (Central Processing Unit) 25 on the motherboard of the personal computer. Each buck converter converts the rough DC voltage $V_I$ into a lower DC voltage $V_O$ 12. In one example, the lower DC voltage $V_O$ 12 is 1.0 volt DC and is supplied onto the $V_{CC}$ supply voltage terminals 13, 14 and 15 of the CPU 25. The buck converters may be of conventional design. In one example, each buck converter includes an input capacitor, a main switch, a second switch (sometimes referred to as a free-wheeling switch), an inductor, an output capacitor, and a control circuit. Buck converter 9, for example, includes an input capacitor 16, a main switch 17, a free-wheeling switch 18, an inductor 19, an output capacitor 20, and a control circuit 27.

FIG. 2 (Prior Art) is a waveform diagram that illustrates operation of the three buck converters 9, 10 and 11 of FIG. 1. The three control circuits of the buck converters cause the main switches of the buck converters to be turned on and off in the phased relationship illustrated in FIG. 2. As a result, the inductor currents 21, 22 and 23 also have a phased relationship. The output capacitors of the buck converters are coupled together in parallel. Conductor 24 couples the output voltage nodes of the three buck converters together at a location near the CPU. Accordingly, the three buck converters together share the function of supplying the necessary supply current $I_{CC}$ to the CPU 25 at the desired $V_O$ output voltage required by the CPU. Due to the phased relationship of the switching of the buck converters, the overall supply current $I_{CC}$ as supplied to the CPU has a smaller ripple current 26 than if just one buck converter of similar size were used. In some cases, the three control circuits are parts of the same single control integrated circuit.

SUMMARY

A buck step-down DC-to-DC switching converter has a self-driven Bipolar Junction Transistor (BJT) synchronous rectifier. In one example, the BJT synchronous rectifier includes a BJT and a parallel-connected diode. The BJT synchronous rectifier has a low forward voltage drop and as a result the switching converter has reduced power loss as compared to an otherwise similar converter having a rectifier with a larger forward voltage drop. The anode of the diode of the synchronous rectifier is coupled to the emitter of the BJT. The cathode of the diode of the synchronous rectifier is coupled to the collector of the BJT. In one example, the diode is a distributed diode where the distributed diode and the BJT are integrated as parts of a single RBJT (Reverse Bipolar Junction Transistor) semiconductor die.

In a first portion of a switching cycle of the switching converter, a main switch is on and the BJT synchronous rectifier is off. Current flows from an input node of the converter, through the main switch, through the first inductor, to an output node of the converter. Current also flows from the input node of the converter, through the main switch, through the second inductor, to the output node of the converter. Over time, the inductor currents increase.

In a second portion of the switching cycle, the main switch is turned off but the inductor currents continue to flow through the first and second inductors. Current flows from a ground node, through the BJT synchronous rectifier, through the first inductor, to the output node of the converter. The BJT synchronous rectifier is on due to the second inductor drawing a base current from the BJT of the synchronous rectifier. Over time, the inductor currents decrease.

In one example, the main switch is a split-source NFET (N-channel Field Effect Transistor) that is capable of conducting separate currents through the two inductors. A drain of the NFET is coupled to the input node of the converter. A primary source of the NFET is coupled to a first end of the first inductor and to the collector of the BJT. An auxiliary source of the NFET is coupled to a first end of the second inductor and to the base of the BJT. The second end of the first inductor and the second end of the second inductor are coupled together and to the output node of the converter. A control circuit of the converter has a first terminal through which a gate drive signal can be driven onto the gate of the NFET to turn the NFET on. The control circuit also has a second terminal that is coupled via a first resistor to the primary source of the NFET and that is coupled via a second resistor to the auxiliary source of the NFET. To turn the NFET off, the control circuit couples the first and second terminals together, thereby coupling the gate of the NFET to the primary source of the NFET through the first resistor and coupling the gate of the NFET to the auxiliary source of the NFET through the second resistor.

Due to the self-driven nature of the synchronous BJT rectifier, there is no need to provide a low side driver just to supply a control signal to a transistor of the synchronous rectifier. Because no low side driver is required, the control circuitry of the novel converter can be less expensive as compared to an otherwise similar circuit that requires both high side and low side drivers. Because the BJT synchronous rectifier exhibits a low forward voltage drop, power consumption of the converter is lower as compared to power consumption of a conventional buck converter that has a rectifier with a larger forward voltage drop. Due to the self-driven nature of the BJT synchronous rectifier, reliability of the buck converter is improved as compared to conventional buck converters and the circuit is also safer in that possible catastrophic short circuit failures attendant in the conventional buck converter circuits are avoided.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 7A is a top-down diagram of the top metal layer of the NFET die 84 of FIG. 6.

FIG. 7B is a cross-sectional diagram taken along sectional line A-A of FIG. 7A.

FIG. 8A is a top-down diagram of the insulation layer of the NFET die 84 of FIG. 6.

FIG. 8B is a cross-sectional diagram taken along sectional line A-A of FIG. 8A.

FIG. 9A is a top-down diagram of the polysilicon layer of the NFET die 84 of FIG. 6.

FIG. 9B is a cross-sectional diagram taken along sectional line A-A of FIG. 9A.

FIG. 10A is a top-down diagram of the silicon surface of the NFET die 84 of FIG. 6.

FIG. 10B is a cross-sectional diagram taken along sectional line A-A of FIG. 10A.

FIG. 13 is a table that sets forth comparative advantages of the buck converter circuit 73 of FIG. 6 over the conventional buck converter circuit of FIG. 1.

FIG. 14 is a circuit diagram of three buck converters of the type shown in FIG. 6, where the three buck converters are supplying power to a CPU on a personal computer motherboard.

DETAILED DESCRIPTION

Reference will now be made in detail to some embodiments of the invention, examples of which are illustrated in the accompanying drawings.

Figure 3:
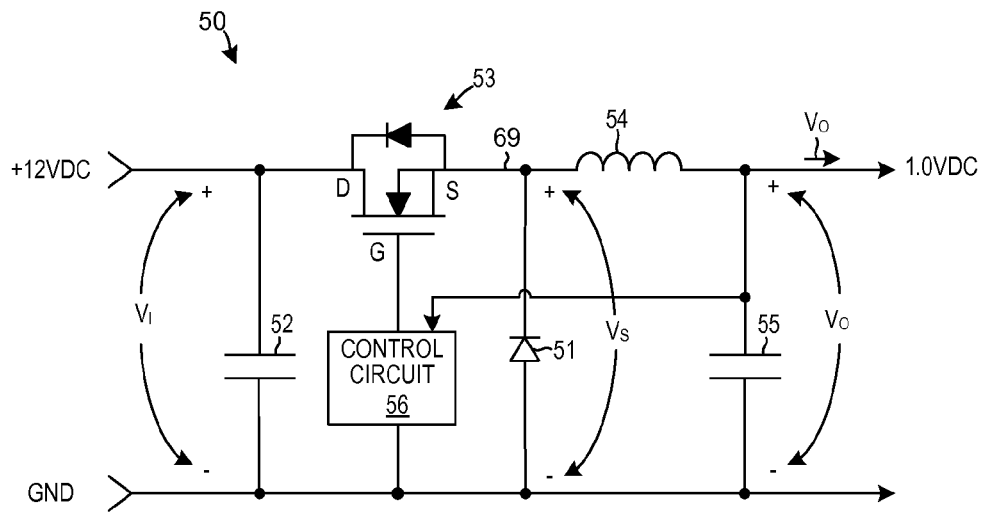
FIG. 3 (Prior Art) is a circuit diagram of a conventional buck converter.
Figure 4:
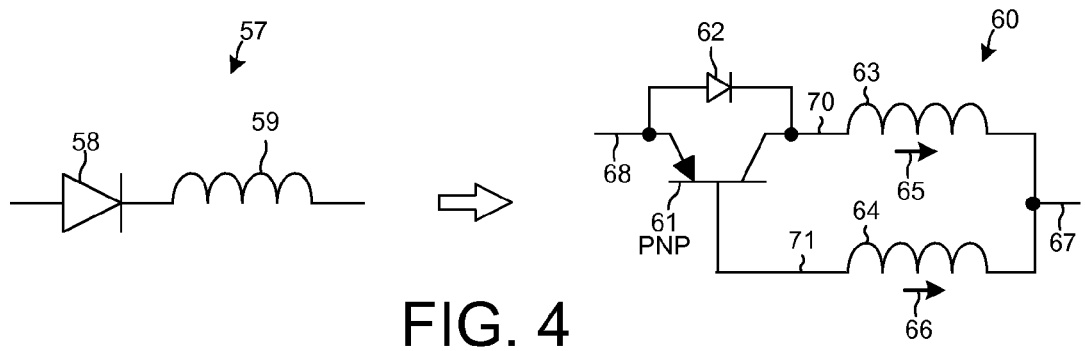
FIG. 4 is a circuit diagram that illustrates a rough equivalence between a circuit 57 and a circuit 60.
Figure 5:
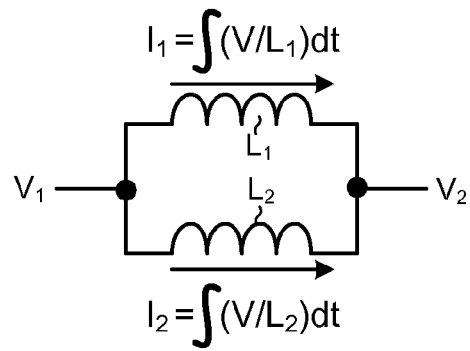
FIG. 5 is a diagram that illustrates inductive current splitting.

FIG. 3 is a diagram of a conventional buck converter circuit 50. Rather than a free-wheeling switch, the buck converter circuit 50 employs a diode 51 in place of the free-wheeling switch 18 of the buck converter circuit 9 of FIG. 1. The buck converter circuit 50 includes an input capacitor 52, a main switch 53, the diode 51, an inductor 54, an output capacitor 55, and a control circuit 56. The inventor has recognized that there is a rough functional equivalence between the circuit 57 having a diode 58 in series with an inductor 59 as shown on the left side of FIG. 4 and the circuit 60 shown on the right side of FIG. 4. The circuit 60 shown on the right side of FIG. 4 includes a bipolar transistor 61, a diode 62, a first inductor 63, and a second inductor 64. Under conditions when a forward potential between nodes 68 and 67 is present across the circuit 60, the bipolar transistor 61 should be on and conducting current. The necessary base current to keep the bipolar transistor 61 on in such conditions is provided by the current-splitting pair of inductors 63 and 64. FIG. 5 illustrates how a current can be split using two inductors, where the ratio of the current I1 passing through one of the inductors L1 to the current I2 passing through the other of the inductors L2 depends on the ratio of the inductances of the two inductors. When the bipolar transistor 61 of FIG. 4 is fully on and conductive, the collector-to-base voltage across the bipolar transistor is relatively small. As a result, the voltages across the two inductors 63 and 64 are substantially equal. As a result, the relationship of currents illustrated in FIG. 5 holds. If a current 65 flows through the inductor 63, then a base current 66 will be drawn from the base of the bipolar transistor.

Assume that bipolar transistor 61 is initially off. Further assume that there is initially no voltage across the circuit 60. If a forward voltage is then placed across the circuit 60 to the right of FIG. 4, then diode 62 will begin to conduct current. This current 65 will flow from node 68, through diode 62, through inductor 63, and to node 67. Because the PN junction between the emitter and base of bipolar transistor 61 is forward biased, a current 66 will be drawn out of the base of the bipolar transistor due to the connection of the circuit components. Drawing the base current from the bipolar transistor will turn on the bipolar transistor. Once the bipolar transistor is fully on, the base current will continue to flow and the current-splitting relationship illustrated in FIG. 5 will be exhibited.

In conditions in which when the diode 58 of the circuit 57 to the left of FIG. 4 is reverse biased and is not conducting current, the bipolar transistor 61 of the circuit 60 to the right of FIG. 4 should be off. The circuit 60 should not be conducting current. Due to the diode 62 being reverse biased, and due to the connection of the bipolar transistor 61, current cannot flow in the reverse direction from node 67 to node 68. As a result, there is no inductor current 65. Because the emitter-to-base PN junction of bipolar transistor 61 is reverse biased, there is also no inductor current 66. There is therefore no base current and the bipolar transistor 61 is off. Accordingly, the circuit 60 to the right of FIG. 4 is recognized to be a rough equivalent to the series-connected diode and inductor circuit 57 to the left of FIG. 4.

The circuit 60 to the right of FIG. 4 cannot, however, simply be substituted for the diode 51 and inductor 54 in the buck converter circuit 50 of FIG. 3, however, due to the source of the main switch 53 being coupled to node 69 in the circuit of FIG. 3. When the main switch 53 is off, for the circuit 60 to the right of FIG. 4 to operate with the current splitting inductors, the current flow through inductor 64 must draw base current. Similarly, the current flow through inductor 63 must be the same current as the collector current. The nodes 70 and 71 cannot therefore be shorted together at the source of the main switch. The inventor, however, has recognized that the main switch of the buck converter circuit can be realized as an N-channel field effect transistor (NFET) having two source terminals. Such an NFET is sometimes said to have a "split source". One of the source terminals can be coupled to the node 70 of the circuit 60, whereas the other of the source terminals can be coupled to the node 71 of the circuit 60.

Figure 6:
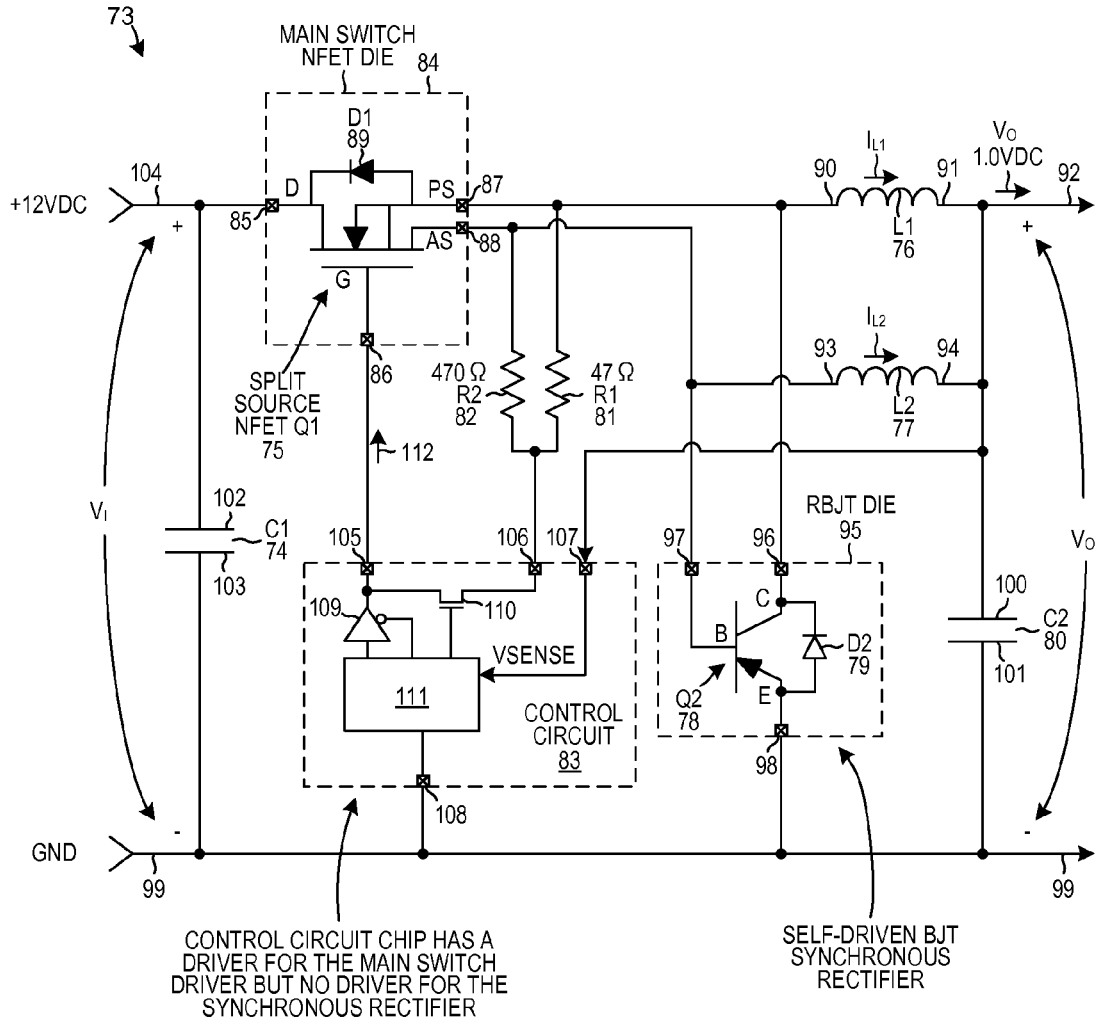
FIG. 6 is a circuit diagram of a buck converter switching circuit 73 having a self-driven BJT synchronous rectifier in accordance with one novel aspect.

FIG. 6 is a circuit diagram of a buck converter switching converter circuit 73 in accordance with one novel aspect. Circuit 73 includes an input capacitor 74, a split-source N-channel field effect transistor (NFET) Q1 75, a first inductor L1 76, a second inductor L2 77, a PNP bipolar transistor Q2 78, a diode D2 79, an output capacitor 80, a first resistor 81, a second resistor 82, and a control circuit 83. The split-source NFET Q1 75 has a gate G, a drain D, a primary source PS, and an auxiliary source AS.

In the illustrated example, the split-source NFET is part of an NFET die 84. Reference numeral 85 identifies the drain terminal of the die; reference numeral 86 identifies the gate terminal of the die; reference numeral 87 identifies the primary source terminal of the die; and reference numeral 88 identifies the auxiliary source terminal of the die. The NFET structure of the die 84 includes an inherent diode D1 89. Diode D1 is inherently present in the structure of the NFET 75. NFET 75 is a vertical transistor structure.

In the buck converter circuit 73, a first end 90 of the first inductor L1 76 is coupled to the primary source PS of the NFET, whereas a second end 91 of the first inductor 76 is coupled to an output terminal and node 92. A first end 93 of the second inductor L2 77 is coupled to the auxiliary source AS of the NFET, whereas a second end 94 of the second inductor 77 is coupled to the output terminal and node 92. The bipolar transistor 78 and diode D2 79 are parts of the same RBJT semiconductor die 95. For additional information on a suitable RBJT semiconductor die usable in the converter of FIG. 6, see: U.S. patent application Ser. No. 13/299,340, entitled "Bipolar Junction Transistor For Current Driven Synchronous Rectifier", filed Nov. 17, 2011, by Kyoung Wook Seok (the entire subject matter of which is incorporated herein by reference). Reference numeral 96 identifies the collector terminal of the RBJT die; reference numeral 97 identifies the base terminal of the RBJT die; reference numeral 98 identifies the emitter terminal of the RBJT die. The anode of diode 79 is coupled to the collector terminal 96 of BJT 78. The cathode of diode 79 is coupled to the emitter terminal 98 of BJT 78. The base terminal 97 of the RBJT die 95 is coupled to the first end 93 of the second inductor 77 and to the auxiliary source terminal AS 88 of the NFET die 84. The collector terminal 96 of the RBJT die 95 is coupled to the first end 90 of the first inductor 76 and to the primary source terminal PS 87 of the NFET die. The emitter terminal 98 of the RBJT die 95 is coupled to ground terminal and node 99. Output capacitor 80 has a first plate 100 and a second plate 101. The first plate 100 is coupled to the second end 91 of the first inductor 76. The second plate 101 is coupled to the emitter terminal 98 of the RBJT die 95. Input capacitor 74 has a first plate 102 and a second plate 103. The first plate 102 is coupled to the drain terminal 85 of the NFET die 84 and to input terminal and node 104. The second plate 103 is coupled to the ground terminal and node 99. The control circuit die 83 has a first terminal 105, a second terminal 106, a third terminal 107 and a fourth terminal 108. The first terminal 105 is coupled to the gate terminal 86 of the NFET die 84. The first resistor R1 81 is coupled between the primary source terminal PS 87 of the NFET die 84 and the second terminal 106 of the control circuit die 83. The second resistor R2 82 is coupled between the auxiliary source terminal AS 88 of the NFET die 84 and the second terminal 106 of the control circuit die 83. The fourth terminal 108 is coupled to the ground terminal and node 99. The control circuit die 83 comprises a "high-side" gate driver 109, circuitry 110 for coupling the first and second terminals 105 and 106 together, as well as output voltage sensing and control circuitry 111. In one novel aspect, the control circuit die 83 includes no driver that is coupled to drive a gate of any transistor whose source is coupled to the second plate 101 of the output capacitor 101. There is no such driver (commonly referred to as a "low side" driver), nor is there any terminal or pin provided that is coupled to the output of any such low side driver. The third terminal 107 of the control circuit die 83 is coupled to the output terminal and node 92 so that the control circuit 111 can sense the output voltage $V_O$. A supply voltage $V_I$ (for example, +12 volts DC) is received onto the buck converter circuit 73 across input terminal 104 and ground terminal 99. The buck converter circuit 73 outputs the output voltage $V_O$ (for example, +1.0 volts DC) onto output terminal 92 so that the output voltage $V_O$ is present across output terminal 92 and ground terminal 99.

FIG. 7A is a diagram looking down onto the top metal layer of the NFET die 84 of FIG. 6.

FIG. 7B is a cross-sectional diagram taken along sectional line A-A of FIG. 7A.

FIG. 8A is a diagram looking down onto the insulation layer of the NFET die 84 of FIG. 6. The overlaying metal layer is not shown.

FIG. 8B is a cross-sectional diagram taken along sectional line A-A of FIG. 8A.

FIG. 9A is a diagram looking down onto the polysilicon gate layer of the NFET die 84 of FIG. 6. The overlaying insulation and metal layers are not shown.

FIG. 9B is a cross-sectional diagram taken along sectional line A-A of FIG. 9A.

FIG. 10A is a diagram looking down onto the silicon surface of the NFET die 84 of FIG. 6. The overlaying polysilicon, insulation and metal layers are not shown.

FIG. 10B is a cross-sectional diagram taken along sectional line A-A of FIG. 10A.

First portion of the Switching Cycle: In a first portion of a switching cycle of the buck converter circuit 73 of FIG. 6, the control circuit die 83 asserts a control signal 112 onto the gate of the main switch NFET Q1 75, and thereby controls the main switch NFET to turn on. A first current then flows in a first current path from the input terminal and node 104, through the NFET Q1 75, out of the primary source terminal PS 87 of the NFET die 84, through the first inductor L1 76, and to output terminal and node 92. A third current also flows in a third current path from the input terminal and node 104, through the NFET Q1 75, out of the auxiliary source terminal AS 88 of the NFET die 84, through the second inductor L2 77, and to output terminal and node 92. During this time, bipolar transistor Q2 78 is off, and diode D2 79 is not forward biased and is not conducting current. Over time, the magnitude of the inductor currents flowing through the two inductors increase. The current supplied to the output node 92 either charges the output capacitor 80 and/or is supplied to a load coupled across the output terminal and ground terminal.

In this first portion of the switching cycle, the high side driver 109 of the control circuit die 83 is enabled and drives an adequately high voltage onto the gate of the NFET 75 to cause the NFET 75 to be turned on. In the illustrated example, this voltage is about +22 volts. The circuitry 110 for coupling the first and second terminals 105 and 106 together is turned off.

Second portion of the Switching Cycle: In the second portion of the switching cycle, the control circuit die 83 controls the main switch 75 to turn off. Even though the main switch 75 is off, current flow through the first inductor L1 does not stop. Rather, a second current then flows in a second current path from the ground terminal and node 99, up through the RBJT die 95, out of the collector terminal 96 of the RBJT die 95, through the first inductor L1 76, and to output terminal and node 92. Likewise, current flow through the second inductor does not stop, but rather a fourth current flows in a fourth current path from the ground terminal and node 99, through the RBJT die 95, out of the base terminal 97 of the RBJT die 95, through the second inductor L2 77, and to output terminal and node 92. Bipolar transistor Q2 78 is on. Initially during the second portion, if the bipolar transistor Q2 78 is not conductive and if an adequately large VCE voltage develops across the bipolar transistor, then diode D2 79 may become forward biased and may begin to conduct. Once current flow is established, then the current splitting inductors cause adequate current to be drawn from the base of the bipolar transistor, thereby turning the bipolar transistor 78 on. When the bipolar transistor 78 turns on, the VCE voltage drop across the bipolar transistor decreases and the diode D2 79 no longer conducts. Similarly, at the end of the second portion of the switching cycle, the bipolar transistor Q2 78 may be turning off but may not yet be fully turned off. As a result, a VCE may momentarily develop across the bipolar transistor. The diode D2 79 may therefore conduct during this short time at the end of the second portion.

In this second portion of the switching cycle, the high side driver 109 of the control circuit die 83 is disabled. The circuitry 110 for coupling the first and second terminals 105 and 106 together is enabled, thereby shorting the primary and auxiliary source terminals of NFET die to the gate terminal of the NFET die. The gate of the NFET Q1 75 is therefore coupled to the primary source via first resistor R1 81, and the gate of the NFET Q1 75 is coupled to the auxiliary source via second resistor R2 82. Because the $V_{GS}$ of the NFET Q1 75 is zero, the NFET Q1 75 is turned off.

Resistors 81 and 82 are provided to slow the turn on and turn off the NFET Q1 75. If the NFET Q1 75 were to turn on too fast, or to turn off too fast, then there may be excessive oscillations of the voltage between drain and source and of the voltage between gate and source. The gate-to-primary source capacitance and the resistance of resistor R1 81 together form an RC filter Likewise, the gate-to-auxiliary source capacitance and the resistor of resistor R2 82 together form an RC filter. These RC filters reduce oscillations and prevent excessive switching energy loss.

The particular control circuit 83 illustrated in FIG. 6 is but one of several different control circuits that can be employed. For example, driver 109 may include two field effect transistors, where a first transistor is coupled between a high-side voltage source node and the first terminal 105, and where a second transistor is coupled between the first terminal 105 and the second terminal 106. If the main switch is to be turned on, then the first transistor is turned on and the second transistor is turned off such that the high-side voltage is conducted through the first transistor and onto the gate of the main switch. If the main switch is to be turned off, then the first transistor is turned off and the second transistor is turned on such that the first and second terminals 105 and 106 are coupled together. The buck converter 73 of FIG. 6 is not limited to require the particular driver 109 and circuit 110 depicted in FIG. 6.

Figure 11:
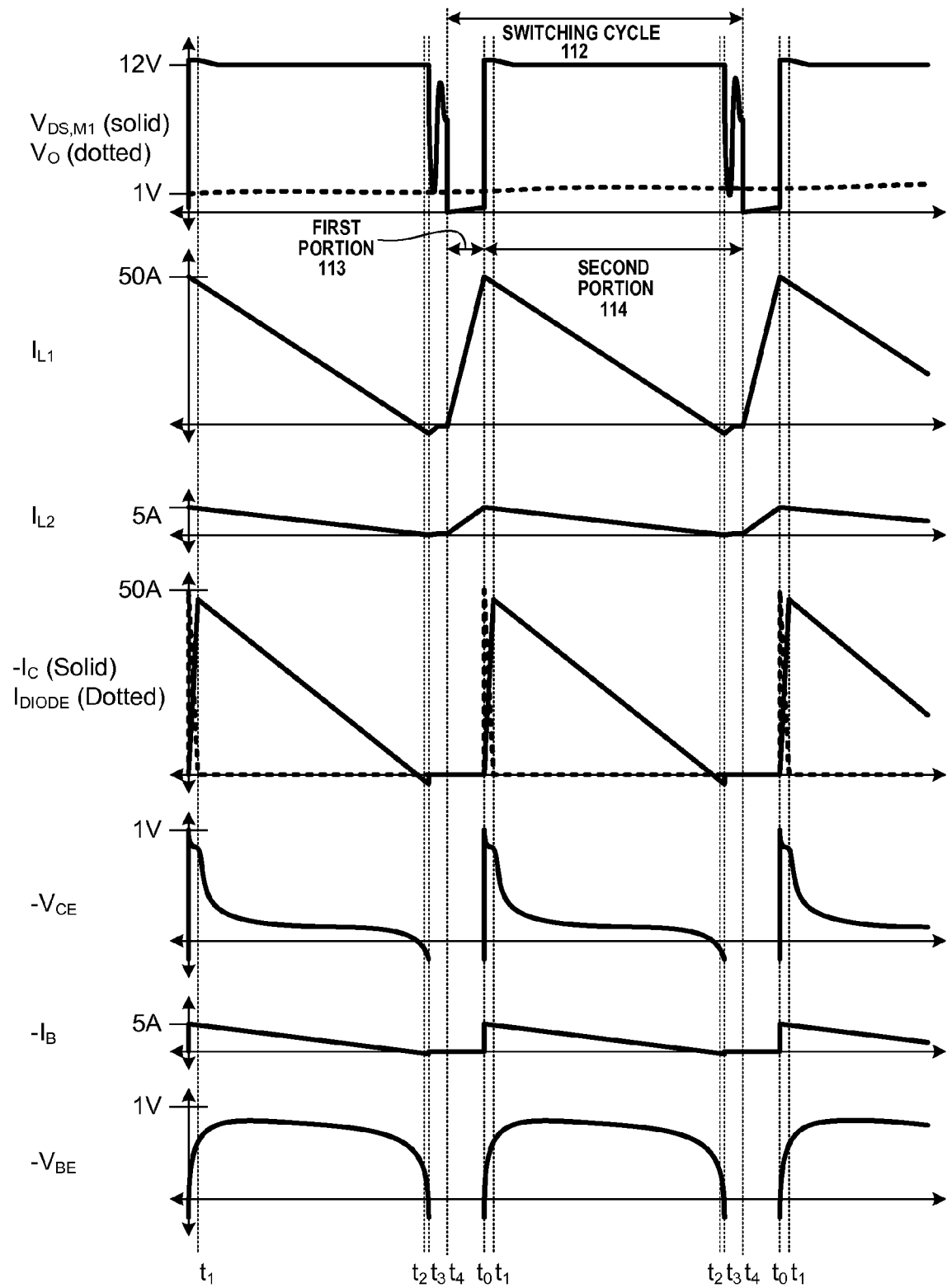
FIG. 11 is a waveform diagram showing operation of the buck converter circuit 73 of FIG. 6 in the discontinuous conduction mode.

FIG. 11 is a waveform diagram that illustrates circuit operation in the discontinuous conduction mode. The first portion 113 of a switching cycle 112 is between times t4 and t0. The second portion 114 of the switching cycle 112 is between times t0 and t4. Operation is said to be "discontinuous" because the inductor current $I_{L1}$ flowing through inductor L1 is zero for some period of the second portion.

Figure 12:
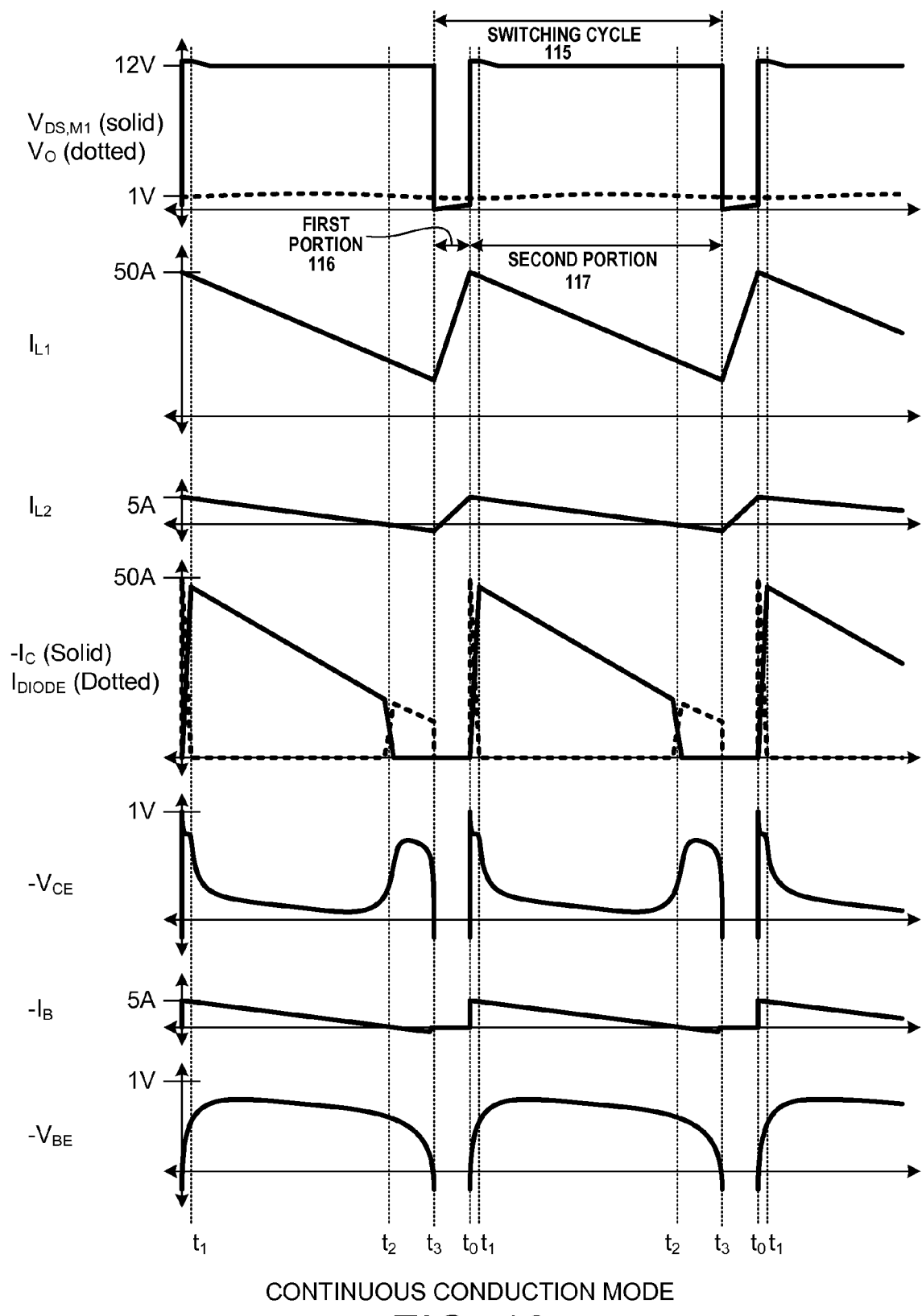
FIG. 12 is a waveform diagram showing operation of the buck converter circuit 73 of FIG. 6 in the continuous conduction mode.

FIG. 12 is a waveform diagram that illustrates circuit operation in the continuous conduction mode. The first portion 116 of a switching cycle 115 is between times t3 and t0. The second portion 117 of the switching cycle 115 is between times t0 and t3.

The waveforms presented above and the description of the operation of the converter of FIG. 6 presented above are simplified and are presented in simplified form for instructional purposes. For a more accurate and detailed understanding of the operation of a particular implementation of the novel converter circuit, an embodiment of the circuit may be simulated using a circuit simulator such as SPICE, or an embodiment of the circuit may be fabricated and then the behavior of the circuit may be observed and measured.

Figure 1:
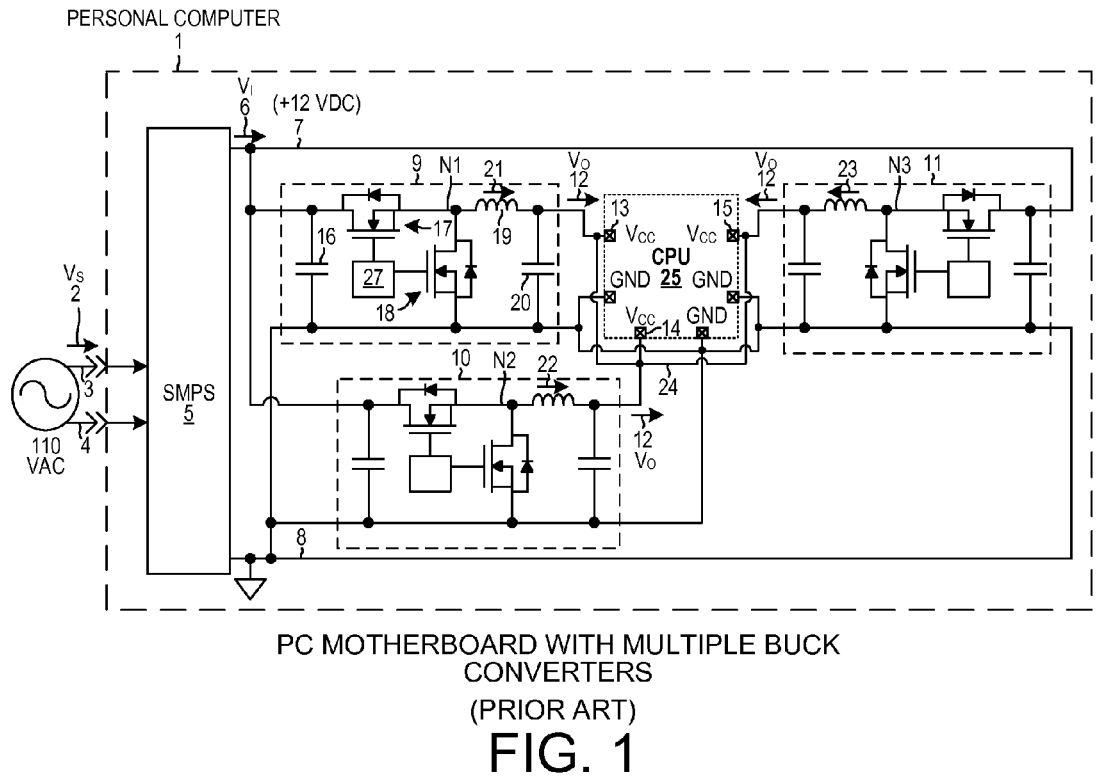
FIG. 1 (Prior Art) is a circuit diagram of three conventional buck converters supplying power to a CPU on a personal computer motherboard.
Figure 2:
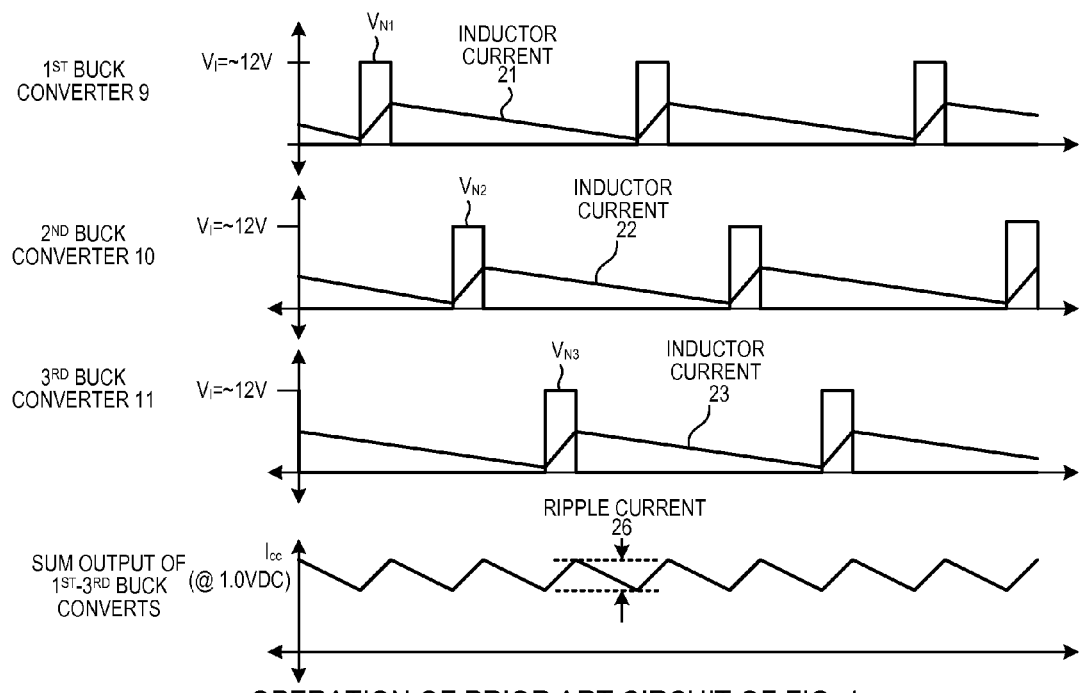
FIG. 2 (Prior Art) is a waveform diagram that illustrates operation of the three buck converters of FIG. 1.

A first advantage of the novel buck converter circuit 73 of FIG. 6 is that the control circuit die 83 is made smaller and less expensive as compared to the control circuit used in the conventional buck converter circuit 9 of FIG. 1. In the conventional buck converter circuit 9 of FIG. 1, both a high side driver and a low side driver are required. The low side driver is required to control the free-wheeling NFET 18. In the novel buck converter circuit 73 of FIG. 6, on the other hand, the bipolar transistor 78 and diode 79 are a "self-driven bipolar junction transistor (BJT) synchronous rectifier". The synchronous rectifier is said to be "self-driven" because it does not need to be receive a separate control signal from the control circuit die 83. Rather, the synchronous rectifier turns itself on and off automatically in response to voltages and currents of the main switch and inductors. The synchronous rectifier therefore does not require a dedicated low side driver to supply a control signal onto the switch of the synchronous rectifier. Accordingly, only one gate driver is needed in the buck converter circuit 73. The elimination of the prior art low side gate driver and its associated package terminal serves to reduce manufacturing cost of the buck converter circuit 73 of FIG. 6.

A second advantage of the novel buck converter circuit 73 is reduced power consumption as compared to the conventional buck converter circuit 9 of FIG. 1.

A third advantage of the novel buck converter circuit 73 is a safety/reliability advantage in that a short circuit problem attendant with the prior art of FIG. 1 does not exist in the novel circuit. In the conventional buck converter circuit 9 of FIG. 1, if the main switch and the free-wheeling switch are not controlled properly, then both switches may momentarily be on and conductive at the same time. This can cause the circuit to have reliability problems. This can also lead to catastrophic failure of the circuit due to high short circuit currents. The control circuit therefore controls the two switches such that there is a "dead time" when transitioning from the first portion to the second portion, and from the second portion to the first portion. For example, when the main switch is being turned off, an amount of dead time is provided before the free-wheeling switch is controlled to turn on. This dead time is provided to make sure that both switches will not be on simultaneously at this switching transition. Similarly, when the free-wheeling switch is being turned off, an amount of dead time is provided before the main switch is controlled to turn on. This dead time is provided to make sure that both switches will not be on simultaneously at this switching transition. The dead time prevents catastrophic failure of the circuit due to inadvertent short circuit currents, but the dead time also increases power consumption. In dead time, the inductor current must flow through the body diode of the free-wheeling NFET. The body diode voltage drop will be about one volt. Due to the large inductor current flowing through the body diode, this voltage drop results in large power consumption. In the novel buck converter circuit 73 of FIG. 6, however, the self-driven nature of the synchronous rectifier automatically prevents short circuit conditions. When the main switch turns off, the synchronous rectifier automatically turns on. The synchronous rectifier is automatically turned off when the main switch turns on. The self-driven nature of the synchronous rectifier essentially eliminates the dead time. As a result, power consumption is decreased. In addition, reliability and safety of the buck converter is improved as compared to the conventional buck converter circuit 9 of FIG. 1.

FIG. 13 is a table that sets forth comparative advantages of the novel buck converter circuit 73 of FIG. 6 as compared to the conventional buck converter circuit 9 of FIG. 1.

FIG. 14 is a diagram of a personal computer 200 in accordance with one novel aspect. The personal computer 200 employs and includes three instances 201, 202 and 203 of the novel buck converter circuit 73 of FIG. 6. The same reference numerals used in FIG. 6 to designate circuit components are therefore used for each of the three buck converter circuits of FIG. 14. The output terminals of the three buck converter circuits 201-203 are coupled together and are coupled to the multiple $V_{CC}$ supply voltage input terminals of the CPU 204, as illustrated. Also, the ground terminals of the three buck converters circuits 201-203 are coupled together and are coupled to the multiple ground GND terminals of the CPU 204, as illustrated. The personal computer 200 receives a 110 volt AC RMS supply voltage $V_S$ 205 via terminals 206 and 207. A Switching Mode Power Supply (SMPS) 208 converts the AC supply voltage $V_S$ 205 into a rough DC voltage $V_I$ 209. Voltage $V_I$ 209 is present between supply voltage conductor 210 and ground conductor 211. In one example, voltage $V_I$ is +12 volts DC. Each buck converter 201-203 converts the rough DC voltage $V_I$ into a lower DC voltage $V_O$ 212. In one example, the lower DC voltage $V_O$ 212 is +1.0 volt DC. The lower DC voltage $V_O$ 212 is supplied onto the multiple $V_{CC}$ supply voltage input terminals of the CPU. The three buck converters 201-203 share the function of supplying the necessary supply current $I_{CC}$ to the CPU 204.

Figure 15:
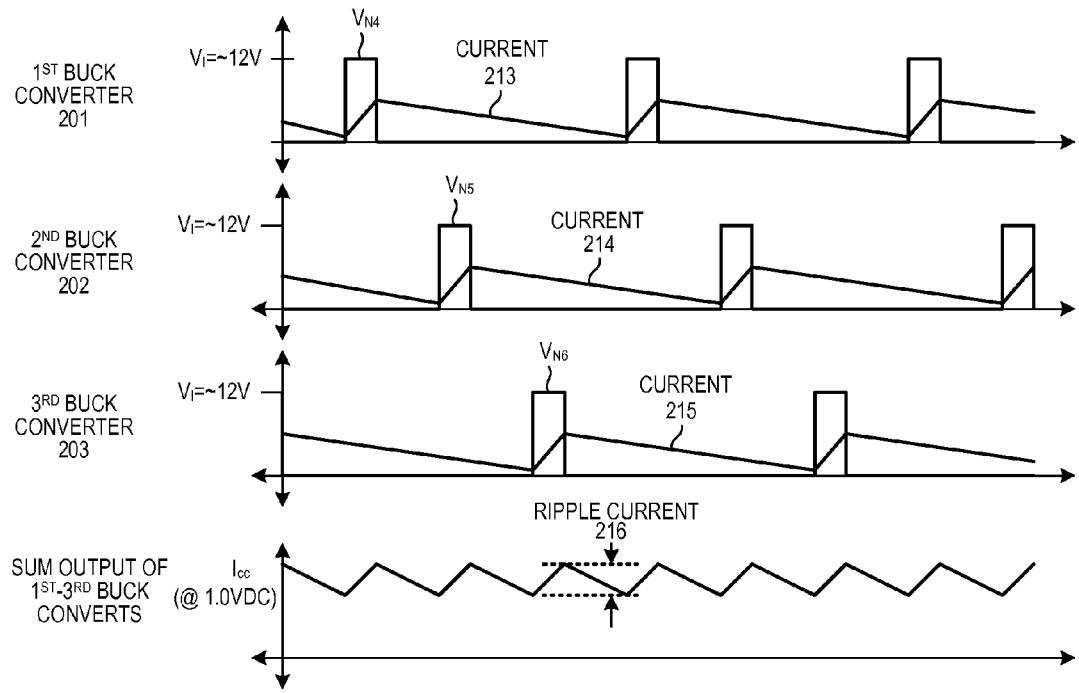
FIG. 15 is a waveform diagram that illustrates operation of the three buck converters of FIG. 14.

FIG. 15 is a waveform diagram that illustrates how the main switches of the three buck converters 201-203 of FIG. 14 are controlled to be turned on and off in the phased relationship illustrated. Currents 213, 214 and 215 also have a phased relationship. Due to the phased relationship of the switching of the buck converters, the overall supply current $I_{CC}$ as supplied to the CPU has a smaller ripple current 216 than if just one buck converter of similar size were used.

Figure 16:
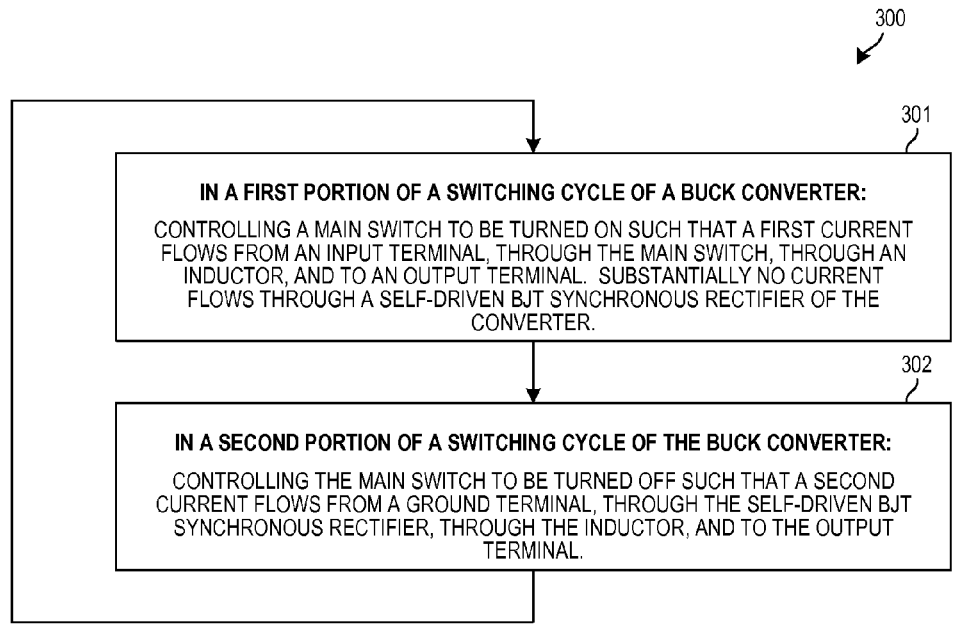
FIG. 16 is a flowchart of a method 300 in accordance with one novel aspect.

FIG. 16 is a flowchart of a method 300 in accordance with one novel aspect. In a first step (step 301), in a first portion of a switching cycle a main switch of a novel buck converter is turned on such that a first current flows from an input terminal of the converter, through the main switch, through a first inductor, and to an output terminal of the converter. Substantially no current flows through a self-driven BJT synchronous rectifier of the converter. In one example, the self-driven BJT synchronous rectifier includes a BJT and a diode, where the anode of the diode is coupled to the emitter of the BJT, and wherein the cathode of the diode is coupled to the collector of the BJT. In a second step (step 302), in a second portion of the switching cycle the main switch is controlled to be turned off such that a second current flows from a ground terminal of the converter, through the self-driven BJT synchronous rectifier, through the first inductor, and to the output terminal. The BJT of the synchronous rectifier is turned on in the second portion of the switching cycle due to a second inductor drawing a base current from the bipolar transistor. The first inductor and the second inductor form a current splitting circuit.

In one particular example of the method, the main switch is a split-source NFET, where the drain of the NFET is coupled to the input terminal of the converter, where the primary source of the NFET is coupled to the first end of the first inductor and to the collector of the BJT, where the auxiliary source of the NFET is coupled to the second end of the second inductor and to the base of the BJT, and where the second ends of the first and second inductors are coupled together and to the output terminal of the converter.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A switching converter circuit, comprising:
a field effect transistor having a gate, a drain, a primary source, and an auxiliary source;
a first inductor having a first end and a second end, wherein the first end of the first inductor is connected to the primary source of the field effect transistor;
a second inductor having a first end and a second end, wherein the first end of the second inductor is connected to the auxiliary source of the field effect transistor, and wherein the second end of the second inductor is connected to the second end of the first inductor;
a bipolar transistor having a base, an emitter, and a collector, wherein the collector is connected to the first end of the first inductor, and wherein the base is connected to the first end of the second inductor;
a diode having an anode and a cathode, wherein the anode is connected to the emitter of the bipolar transistor, and wherein the cathode is connected to the collector of the bipolar transistor; and
an output capacitor having a first plate and a second plate, wherein the first plate is connected to the second end of the first inductor, and wherein the second plate is connected to the emitter of the bipolar transistor.

2. The switching converter circuit of claim 1, further comprising:
a control circuit having a first terminal and a second terminal, wherein the first terminal is coupled to the gate of the field effect transistor; and
a resistor coupled between the second terminal of the control circuit and the primary source of the field effect transistor.

3. The switching converter circuit of claim 1, further comprising:
a control circuit having a first terminal and a second terminal, wherein the first terminal is coupled to the gate of the field effect transistor; and
a resistor coupled between the second terminal of the control circuit and the auxiliary source of the field effect transistor.

4. The switching converter circuit of claim 3, wherein the control circuit includes no driver that is coupled to drive a gate of any transistor whose source is coupled to the second plate of the output capacitor.

5. The switching converter circuit of claim 1, further comprising:
a control circuit having a first terminal and a second terminal, wherein the first terminal is coupled to the gate of the field effect transistor;
a first resistor coupled between the second terminal of the control circuit and the primary source of the field effect transistor; and
a second resistor coupled between the second terminal of the control circuit and the auxiliary source of the field effect transistor.

6. The switching converter circuit of claim 1, further comprising:
a control circuit die that comprises a main switch gate driver but comprises no freewheeling switch gate driver, wherein the main switch gate driver is coupled to the gate of the field effect transistor.

7. The switching converter circuit of claim 1, further comprising:
a control circuit die that comprises a main switch gate driver, wherein the main switch gate driver is coupled to drive the gate of the field effect transistor, and wherein the control circuit die includes no driver that is coupled to drive a gate of any transistor whose source is coupled to the second plate of the output capacitor.

8. The switching converter circuit of claim 1, wherein the diode and the bipolar transistor are parts of a die, and wherein the diode is a distributed diode.

9. The switching converter circuit of claim 1, wherein in a first portion of a switching cycle of the switching converter circuit, the field effect transistor conducts a first current in a first current path that extends through the field effect transistor, through the first inductor, and onto the first plate of the output capacitor, and wherein in a second portion of the switching cycle of the switching converter circuit, the bipolar transistor conducts a second current in a second current path that extends from the second plate of the output capacitor, through the bipolar transistor, through the first inductor, and onto the first plate of the output capacitor.

10. The switching converter circuit of claim 9, wherein in the first portion of the switching cycle substantially no current flows through the bipolar transistor.

11. The switching converter circuit of claim 9, wherein in the second portion of the switching cycle substantially no current flows through the field effect transistor.

12. The switching converter circuit of claim 1, further comprising: an output terminal of the switching converter circuit, wherein the first plate of the output capacitor is coupled to the output terminal; and a ground terminal of the switching converter circuit, wherein the second plate of the output capacitor is coupled to the ground terminal.

13. The switching converter circuit of claim 1, further comprising: a gate driver that drives the gate of the field effect transistor, wherein the switching converter circuit includes no driver that is coupled to drive a gate of any transistor whose source is coupled to the second plate of the output capacitor.

14. A method comprising:
in a first portion of a switching cycle of a buck converter controlling a main switch to be turned on such that a first current flows in a first current path from an input terminal, through the main switch, through a first inductor, and to an output terminal of the buck converter, wherein in the first portion of the switching cycle substantially no current flows through a bipolar transistor of the buck converter; and
in a second portion of the switching cycle controlling the main switch to be turned off such that a second current flows in a second current path from a ground terminal, through the bipolar transistor, through the first inductor, and to the output terminal, wherein in the second portion of the switching cycle substantially no current flows through the main switch and further comprising: in the first portion of the switching cycle causing a third current to flow in a fourth current path through the main switch, and through a second inductor, and to the output terminal; and in the second portion of the switching cycle drawing a base current out of a base of the bipolar transistor such that the bipolar transistor is conductive in the second portion of the switching cycle, wherein the base current flows in the second portion of the switching cycle in a fifth current path from the base of the bipolar transistor, through the second inductor, and to the output terminal.

15. The method of claim 14, further comprising:
storing energy in an output capacitor, wherein a first plate of the output capacitor is coupled to the output terminal, and wherein the second plate of the output capacitor is coupled to the ground terminal.

16. The method of claim 15, further comprising:
supplying a control signal onto a gate of the main switch, wherein the control signal is generated by a gate driver of a control circuit die, wherein the control circuit die includes no driver that is coupled to drive a gate of any transistor whose source is coupled to the second plate of the output capacitor.

17. The method of claim 14, wherein the main switch is a field effect transistor, and wherein the field effect transistor has a primary source and an auxiliary source, wherein the primary source is coupled to the first inductor, and wherein the auxiliary source is coupled to a base of the bipolar transistor.

18. The method of claim 17, wherein a gate of the main switch is driven by a gate driver of a control circuit die, wherein the gate driver supplies a control signal to the gate of the main switch via a first terminal of the control circuit die, wherein the primary source is coupled via a first resistor to a second terminal of the control circuit die, and wherein the auxiliary source is coupled via a second resistor to the second terminal of the control circuit die.

* * * * *